(12) United States Patent
Geyer et al.

(10) Patent No.: US 9,124,363 B2
(45) Date of Patent: Sep. 1, 2015

(54) DIGITAL FREQUENCY OFFSET MONITOR FOR COHERENTLY DETECTED OPTICAL SUPERCHANNELS

(75) Inventors: Jonas Geyer, Seukendorf (DE); Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 13/487,346

(22) Filed: Jun. 4, 2012

(65) Prior Publication Data

US 2013/0322877 A1 Dec. 5, 2013

(51) Int. Cl.
H04B 17/00 (2015.01)
H04B 10/079 (2013.01)

(52) U.S. Cl.
CPC .............................. *H04B 10/07957* (2013.01)

(58) Field of Classification Search
CPC ................................................ H04B 10/07957
See application file for complete search history.

(56) References Cited

U.S. PATENT DOCUMENTS

| | | | |
|---|---|---|---|
| 5,949,562 A * | 9/1999 | Kubota et al. | 398/79 |
| 6,246,965 B1 * | 6/2001 | Cockerham et al. | 702/85 |
| 6,392,769 B1 * | 5/2002 | Ford et al. | 398/9 |
| 6,839,366 B1 | 1/2005 | Houle | |
| 7,039,319 B1 | 5/2006 | Moulton et al. | |
| 7,587,139 B1 | 9/2009 | Bonnedal et al. | |
| 7,693,419 B1 * | 4/2010 | Chen et al. | 398/25 |
| 8,111,988 B1 * | 2/2012 | Schantz et al. | 398/34 |
| 2002/0005948 A1 * | 1/2002 | Ishihara | 356/300 |
| 2004/0165886 A1 * | 8/2004 | Barwicz et al. | 398/33 |
| 2005/0089330 A1 * | 4/2005 | Grot et al. | 398/139 |
| 2007/0264010 A1 * | 11/2007 | Bartolini | 398/9 |
| 2007/0297468 A1 * | 12/2007 | Stewart et al. | 372/33 |
| 2008/0131126 A1 | 6/2008 | Gerstel et al. | |
| 2009/0232493 A1 * | 9/2009 | Tu | 398/17 |
| 2009/0247101 A1 * | 10/2009 | Zhang et al. | 455/182.3 |
| 2010/0082291 A1 * | 4/2010 | Wen et al. | 702/180 |
| 2011/0150477 A1 * | 6/2011 | Winzer | 398/65 |
| 2011/0150503 A1 * | 6/2011 | Winzer | 398/202 |
| 2011/0194043 A1 * | 8/2011 | Barbarossa | 349/41 |
| 2012/0070146 A1 * | 3/2012 | Hinderthuer | 398/13 |
| 2012/0170937 A1 * | 7/2012 | Van Leeuwen | 398/76 |
| 2013/0004154 A1 * | 1/2013 | Schriefer | 398/9 |
| 2013/0279912 A1 * | 10/2013 | Lyubomirsky et al. | 398/65 |
| 2013/0322877 A1 * | 12/2013 | Geyer et al. | 398/38 |

\* cited by examiner

*Primary Examiner* — Ken Vanderpuye
*Assistant Examiner* — Amritbir Sandhu
(74) *Attorney, Agent, or Firm* — Edell, Shapiro & Finnan, LLC (57) ABSTRACT

Techniques are provided to estimate a distance of one received optical subchannel to one or both of its neighbor (adjacent) subchannels. An optical field comprised of a plurality of subchannels of optical signals at respective wavelengths is received on an optical fiber. Using coherent optical reception in conjunction with analog-to-digital conversion, the received optical field is converted to digital complex valued data. The digital complex valued data is transformed to the frequency domain to produce spectrum data. Using either a peak method or a gap method, a distance or spacing is computed between a subchannel of interest among the plurality of subchannels and at least one neighbor subchannel based on the spectrum data.

31 Claims, 6 Drawing Sheets

DIGITAL FREQUENCY OFFSET MONITOR FOR COHERENTLY DETECTED OPTICAL SUPERCHANNELS

TECHNICAL FIELD

The present disclosure relates to optical communication systems and devices.

BACKGROUND

In optical communication networks, optical superchannels are used to transmit multiple optical signal streams on several subchannels (wavelength subchannels) which are closely spaced to each other. To make best use of the available bandwidth the exact frequency spacing of the subchannels needs to be actively controlled. In this scenario, the optical transmitter uses Nyquist pulse shaping to allow for dense channel spacing.

In a coherent optical network, the optical signals on each wavelength are amplitude and phase modulated and polarization multiplexing is used to further increase throughput. A receiver uses coherent optical reception in conjunction with analog-to-digital conversion to linearly translate the received optical field to electrical signals. The electrical signals are then converted to digital signals and further processed using digital signal processing algorithms. The optical receiver is capable of receiving several (e.g., ten) neighboring channels without having to use an optical channel selection filter.

DESCRIPTION OF EXAMPLE EMBODIMENTS

Overview

Techniques are provided herein to estimate a distance of one received optical subchannel to one or both of its neighbor (adjacent) subchannels. An optical field comprised of a plurality of subchannels of optical signals at respective wavelengths is received on an optical fiber. Using coherent optical reception in conjunction with analog-to-digital conversion, the received optical field is converted to digital complex valued data. The digital complex valued data is transformed to the frequency domain to produce spectrum data. A distance or spacing is computed between a subchannel of interest among the plurality of subchannels and at least one neighbor subchannel based on spectrum data. Two methods are disclosed for computing the distance. One method is based on a distance between certain peaks in the spectrum data and another method is based on a measure of a distance (or gap) between points in the spectrum data that are on opposite sides of a minimum point.

Example Embodiments

Figure 1:
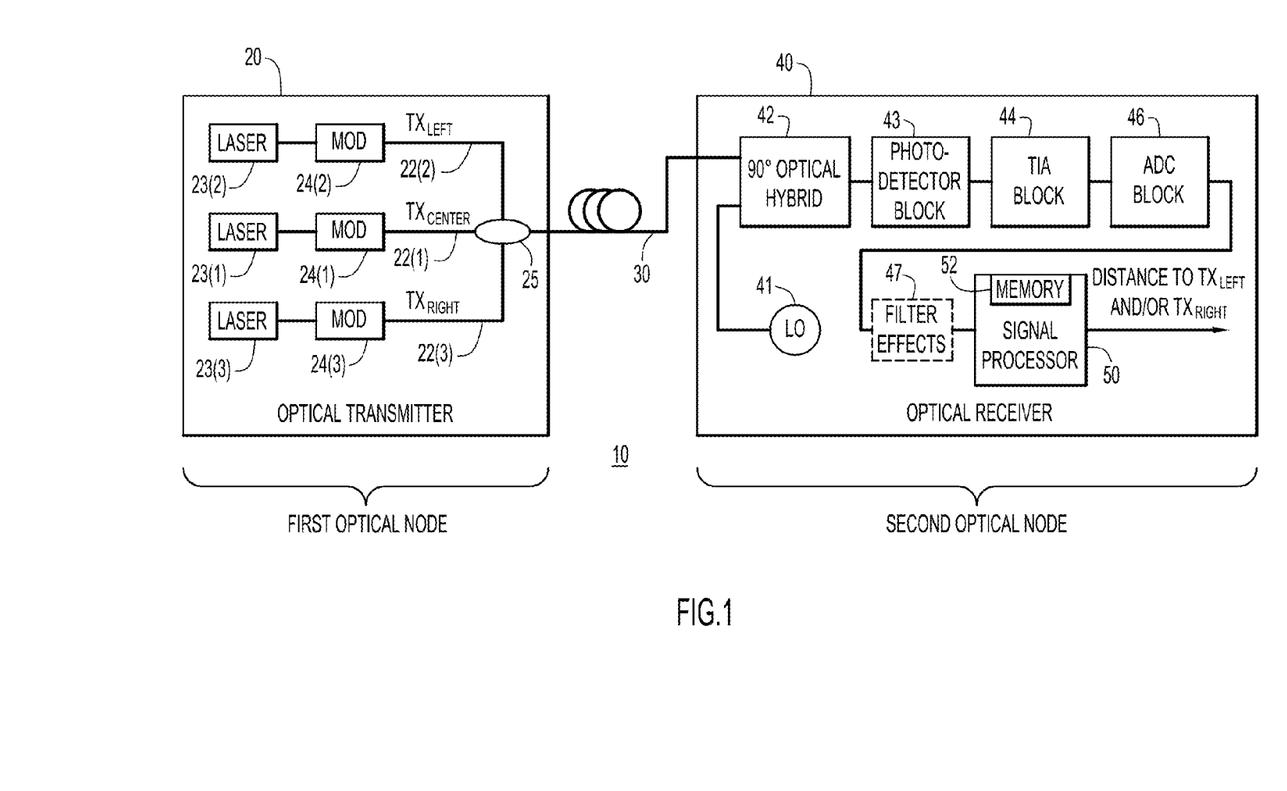
FIG. 1 is a block diagram of an optical communication system in which an optical receiver is configured to determine spacings between adjacent received optical subchannels according to the techniques described herein.

Referring first to FIG. 1, a block diagram is shown of an example optical communication system or network 10 comprising an optical transmitter 20 and an optical receiver 40. The optical transmitter 20 is at a first optical node or device and the optical receiver 40 is at a second optical node or device remote from the first optical node and in communication with the first optical node by way of the optical fiber 30. The first optical node may also include a receiver similar to optical receiver 40 and the second optical node may also include a transmitter similar to optical transmitter 20. For simplicity, the optical receiver at the first node and the optical transmitter at the second node are not shown in FIG. 1.

The optical transmitter 20 comprises a plurality of optical lasers and modulators to transmit multiple wavelengths (subchannels) into optical fiber 30 for dense subchannel spacing of wavelengths. FIG. 1 shows, for example purposes only, three optical subchannels 22(1), 22(2) and 22(3). Subchannel 22(1) is at a wavelength that is in the center or between the wavelengths transmitted by subchannel 22(2) and 22(3). In this example subchannel 22(2) transmits at a wavelength that is to the left of the wavelength transmitted by subchannel 22(1) and subchannel 22(3) transmits at a wavelength that is to the right of the wavelength transmitted by subchannel 22(1). For subchannel 22(1) there is a laser 23(1) and an optical modulator (Mod) 24(1), for subchannel 22(2) there is a laser 23(2) and a Mod 24(2) and for subchannel 22(3) there is a laser 23(3) and a Mod 24(3).

The optical transmitter 20 may use amplitude and phase modulation in conjunction with polarization multiplexing. The optical receiver 40 is capable of receiving several neighboring subchannels without the need to use an optical channel selection filter.

It should be understood that in an actual optical network deployment, more than three wavelengths or subchannels would be transmitted over an optical fiber 30. Furthermore, though not specifically indicated in FIG. 1, the optical transmitter uses Nyquist pulse shaping (e.g., raised cosine filter with roll-off close to zero) to allow for very dense packing of optical subchannels in what is called a "superchannel". In addition, polarization multiplexing may be used to even further increase the throughput. For example, for each wavelength or subchannel, there are two optical signals transmitted, on different polarizations.

The optical signals for the subchannels 22(1)-22(3) are coupled to an optical combiner 25. The optical combiner 25 combines the optical signals on the three wavelengths (left, center, right) and couples the combined optical signal to the optical fiber 30 for propagation therethrough to the optical receiver 40.

The optical receiver 40 comprises a local optical oscillator (LO) 41, a 90° optical hybrid 42, a photodetector block 43, a transmit impedance amplifier (TIA) block 44, an analog-to-digital converter (ADC) block 46 and a signal processor 50.

The LO 41 is a laser that generates a LO optical signal that is supplied as input to the 90° optical hybrid 42. The 90° optical hybrid 42 is a multi-port device that comprises linear dividers and combiners interconnected in such a way that different additions of the LO optical signal and the received optical signal(s) are obtained.

The photodetector block 43 comprises a plurality of photodetector units each configured to convert an optical signal to an electrical signal. The output of the photodetector block 43 is a plurality of electrical signals representative of the received polarization-resolved optical field.

The TIA block 44 comprises a plurality of TIAs each configured to amplify an electrical signal. The number of TIAs in the TIA block 44 generally tracks the number of different electrical signals output by the photodetector block 42. The TIA block 44 outputs a plurality of amplified analog electrical signals.

The ADC block 46 comprises a plurality of ADCs each of which converts the analog electrical signals output by the TIA block 44, to produce a plurality of digital signals. The digital signals are supplied to the signal processor 50. The digital signals output by the ADC block 46 comprise digital complex valued field data representing the polarization-resolved optical field at the optical receiver input. Thus, using coherent optical reception in conjunction with analog-to-digital conversion, the received optical field is translated to digital electrical signals. As explained further hereinafter, the signal processor 50 converts the digital complex value field data to frequency domain data by an appropriate transformation operation, e.g., a Fourier transform, to obtain spectrum data.

FIG. 1 shows a filter effects block 47 to indicate or represent that there is an electrical bandwidth limitation in the optical receiver 40 caused by components in the analog receiver chain (e.g., photodetector block 43, TIA block 44, ADC block 46). The filter effects block 47 is not a dedicated filter device or component, but is shown in FIG. 1 for the sake of completeness.

The signal processor 50 may take a variety of different forms, including a digital signal processor, general purpose programmable microprocessor or microcontroller, fixed digital logic device, programmable digital logic device, hybrid or combination of a fixed and programmable digital logic devices, etc. Thus, the signal processor 50 may be embodied by one or more application specific integrated circuits (ASICs) that include onboard memory 52 or work with a separate memory.

The memory 52 may be used to store measurement data and computation data associated with the processes described herein. The memory 52 may also store computer/processor executable instructions that, when executed by a processor, cause the processor to perform operations described herein.

The memory 52 may comprise read only memory (ROM), random access memory (RAM), magnetic disk storage media devices, optical storage media devices, flash memory devices, electrical, optical, or other physical/tangible memory storage devices. Thus, in general, the memory 52 may comprise one or more tangible (non-transitory) computer readable storage media (e.g., a memory device) encoded with software comprising computer executable instructions and when the software is executed (by the processor 50) it is operable to perform the operations described herein.

Figure 2:
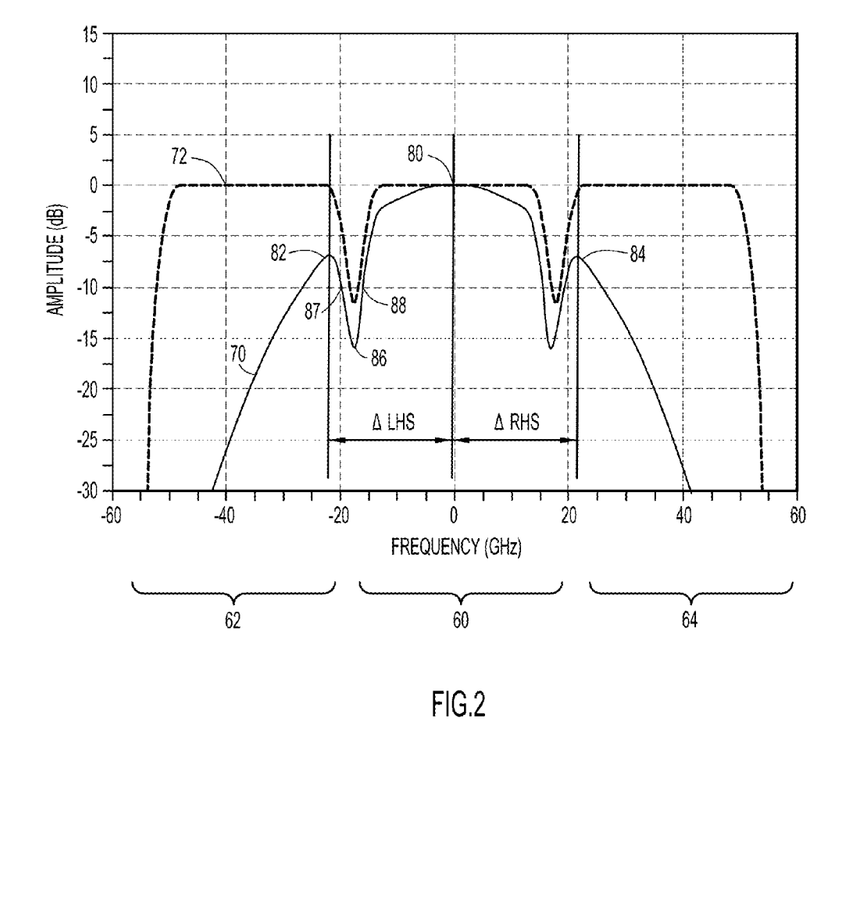
FIG. 2 is a diagram illustrating plots of spectrum data associated with received optical subchannels and showing the spectrum data that is used to determine the spacings between adjacent subchannels.

Reference is now made to FIG. 2. FIG. 2 illustrates spectrum associated with a received optical field for three optical subchannels comprising a center subchannel 60, a neighbor or adjacent subchannel 62 to the left of the center subchannel 60, and a neighbor or adjacent subchannel 64 to the right of center subchannel 60. In an actual optical system, there may be additional subchannels (as part of a super-channel) so the use of the terms "center", "left" and "right" are completely arbitrary and relative to a particular subchannel of interest that is between two other subchannels. In this example, subchannel 60 is the particular subchannel of interest.

There are several plots shown in FIG. 2. The plot 70 in solid line represents the spectrum data output by the ADC block 46 and the plot 72 in dashed line represents the optical spectrum.

According to the techniques described herein, the spacings of the received optical subchannels are determined by analyzing the electrical spectrum data (as depicted by plot 70). One technique, referred to here as the "peak method" involves using the distance between the center of the received optical subchannel and, for example, a peak caused by a neighbor channel, to compute the (center to center) distance to the neighbor channel. For example, in FIG. 2, the subchannel 60, which is between subchannels 62 and 64, has a peak caused by its spectrum shown at 80. The peak 80 could be off from the center of the subchannel 60 due to signal to local oscillator frequency offset. This peak 80 represents the center of subchannel 60 when there is no signal-to-local oscillator frequency offset. When there is signal-to-local oscillator frequency offset the center of subchannel 60 could be derived by using information from digital carrier recovery and frequency estimation techniques, which are part of the coherent receiver signal processing chain. Left neighbor subchannel 62 causes a peak at 82 associated with a righthand edge of the subchannel 62. Likewise, right neighbor subchannel 64 causes a peak at 84 associated with a lefthand edge of subchannel 64.

The distance $\Delta_{LHS}$ is the distance between the center 80 of the subchannel 60 and righthand edge peak 82 of subchannel 62. Similarly, the distance $\Delta_{RHS}$ is the distance between center 80 of the subchannel 64 and the lefthand edge peak 84 of subchannel 64. It has been determined that the (center to center) distance between subchannel 60 and left neighbor subchannel 62 is related to the distance $\Delta_{LHS}$, and the (center to center) distance between subchannel 60 and right neighbor subchannel 64 is related to the distance $\Delta_{RHS}$. Thus, by analyzing the distance (in Hz) between center 80 and peak 82, and between center 80 and peak 84, the (center to center) distance between subchannel 60 and left neighbor subchannel 62, and the (center to center) distance between the subchannel 60 and right neighbor subchannel 64 may be computed.

The (center to center) distance between the subchannel 60 and the left neighbor subchannel 62 may be computed as $\Delta_{LHS}+k$ and the (center to center) distance between the subchannel 60 and the left neighbor subchannel 64 may be computed as $\Delta_{RHS}+k$, where k is a correction term that depends on transmitter and receiver properties, e.g. data rate, spectral shaping (roll-off) at the transmitter, analog bandwidth at the receiver and signal-to-local oscillator frequency offset. The correction term k may be positive or negative. To address these influences k is calculated based on calibration data obtained from, e.g. calibration during manufacturing.

In other words, the distance between the center of the subchannel of interest and the center of the neighbor subchannel is computed by measuring the distance between the center of the subchannel of interest and the peak associated with the edge of the neighbor subchannel and adding to the measured distance a correction term k. This computed distance can then be used to control the wavelength/frequency at the transmitter. For example, a control signal may be computed to control/adjust the amount of frequency/wavelength tuning as $f_{correction} = \Delta f_{target} - (\Delta_{LHS/RHS} + k)$, where $f_{correction}$ is the amount of frequency tuning/adjustment to be made for the laser that generates that subchannel and $\Delta f_{target}$ is the target or desired frequency spacing (center to center) between the subchannel of interest and its neighboring subchannel.

Another technique, referred to herein as the "gap method" involves using the width of a gap between adjacent subchannels, e.g., obtained by evaluating the distance between points in the spectrum that are at a certain (predetermined) power level on opposite sides of a minimum point. As shown in FIG. 2, a minimum point 86 is located in the spectrum data plot 70 between adjacent subchannels, e.g., between subchannel 60 and subchannel 62. Then, the points on the plot 70 on opposite sides of the minimum point 86 and which are at a predetermined power level, e.g., −10 dB, are located, as shown at 87 and 88. The measured distance (in GHz) between points 87 and 88 is computed, and is referred to as Gap, and in the case of the lefthand subchannel 62, referred to as $Gap_{LHS}$ and similarly on the righthand side for subchannel 64 a distance would be computed and referred to as $Gap_{RHS}$. A calculation similar to that described above for the peak method would be used for the gap method, e.g., the center to center distance between the subchannel 60 and its adjacent subchannels 62 and 64 is computed as $Gap_{LHS/RHS}+k'$, wherein this case, k' is a correction term for the gap method that is also determined by means of calibration. In summary, the gap method involves measuring the distance between points in the spectrum data that are on opposite sides of a minimum point and which are at a predetermined power level, and adding to the measured distance ($Gap_{LHS/RHS}$) a correction term (k'), to determine a distance between a center of the subchannel of interest and a center of the neighbor subchannel.

Figure 3:
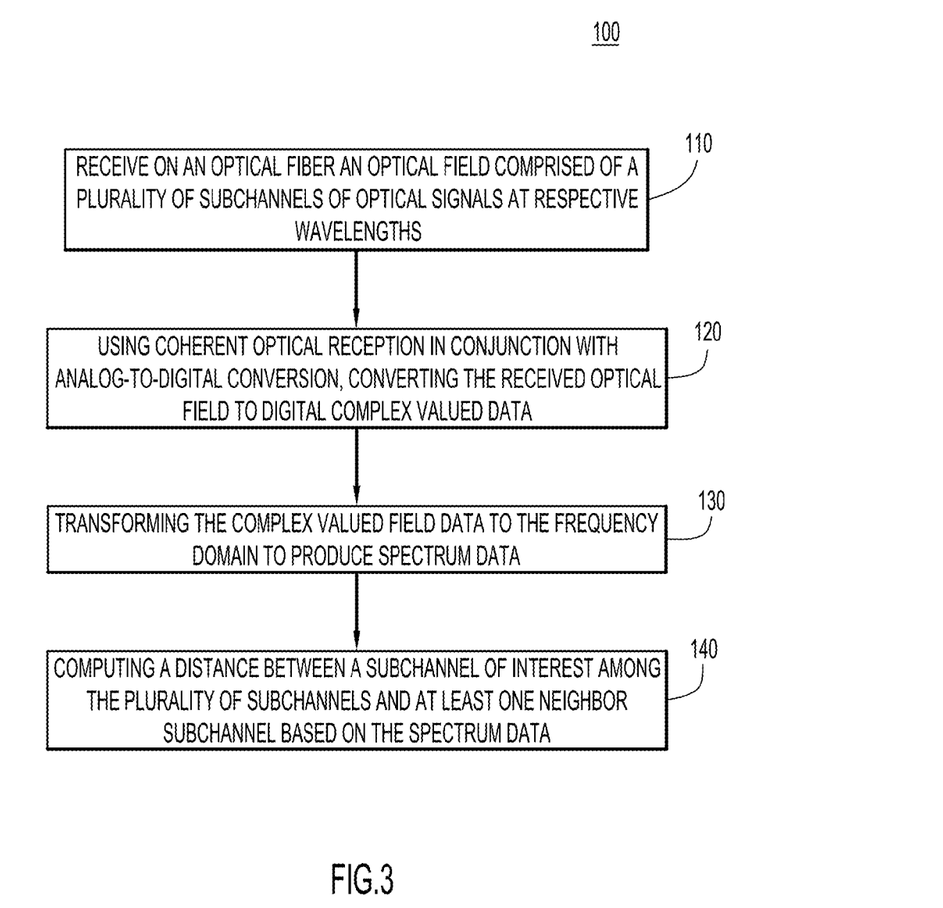
FIG. 3 is an example of a flow chart depicting operations performed to compute spacings between adjacent received optical subchannels according to the techniques described herein.

Reference is now made to FIG. 3, with continued reference to FIGS. 1 and 2, for a description of operations of a process 100 used to determine the spacing or distance between optical subchannels. These operations are performed at an optical receiver, e.g., optical receiver 50 shown in FIG. 1. At 110, an optical field comprised of a plurality of subchannels of optical signals at respective wavelengths is received on an optical fiber at an optical receiver. At 120, using coherent optical reception in conjunction with analog-to-digital conversion, the received optical field is converted to digital complex valued data. For example, the 90° optical hybrid 42 mixes the received optical field with an optical signal from the LO laser to down-mix the received optical field, which is then converted to electrical signals by the photodetector block 43, amplified by the TIA block 44 and converted to digital complex valued data by the ADC block 46. At 130, the complex valued field data is transformed to the frequency domain to produce spectrum data. The operation 130 may be performed by the signal processor 50 or it may be performed by a separate component. At 140, a distance between a subchannel of interest among the plurality of subchannels and at least one neighbor subchannel is computed based on the spectrum data using either the peak method or the gap method (or by both methods and an average of the two methods is used), both of which are described above in connection with FIG. 2. Using the distance computed by the peak method or gap method, an amount of tuning or adjustment for the subchannel of interest can be determined based on a target distance/spacing minus the determined center to center distance between the subchannel of interest and its neighbor subchannel. These techniques can be applied to compute a distance between any given subchannel of interest and each of its neighbor subchannels on opposite sides of the subchannel of interest.

Thus, in summary, FIG. 2 depicts a method that involves receiving on an optical fiber an optical field comprised of a plurality of subchannels of optical signals at respective wavelengths; using a local optical oscillator, converting the received optical field to digital complex valued data; transforming the digital complex valued data to the frequency domain to produce spectrum data; and computing a distance between a subchannel of interest among the plurality of subchannels and at least one neighbor subchannel based on the spectrum data.

Similarly, FIG. 1 depicts an apparatus comprising an optical hybrid unit configured to receive on an optical fiber an optical field comprised of a plurality of subchannels of optical signals at respective wavelengths and to mix the received optical field with a local oscillator optical signal; a photodetector unit coupled to the optical hybrid unit and configured to receive as input a mixed optical field and to convert the mixed optical field to electrical signals; an analog-to-digital converter unit configured to convert the electrical signals to digital complex value data; and a signal processor coupled to the analog-to-digital filter. The signal processor is configured to transform the complex valued data to the frequency to produce spectrum data, and to compute a distance between a subchannel of interest among the plurality of subchannels and at least one neighbor subchannel based on the spectrum data.

In still another form, a software-based implementation of these techniques may be provided, and which is embodied in one or more computer readable storage media encoded with software comprising computer executable instructions and when the software is executed operable to: transform digital complex valued data derived from a received optical field comprising a plurality of subchannels of optical signals at respect wavelengths, to the frequency domain to produce spectrum data; and compute a distance between a subchannel of interest among the plurality of subchannels and at least one neighbor subchannel based on the spectrum data.

Figure 4:
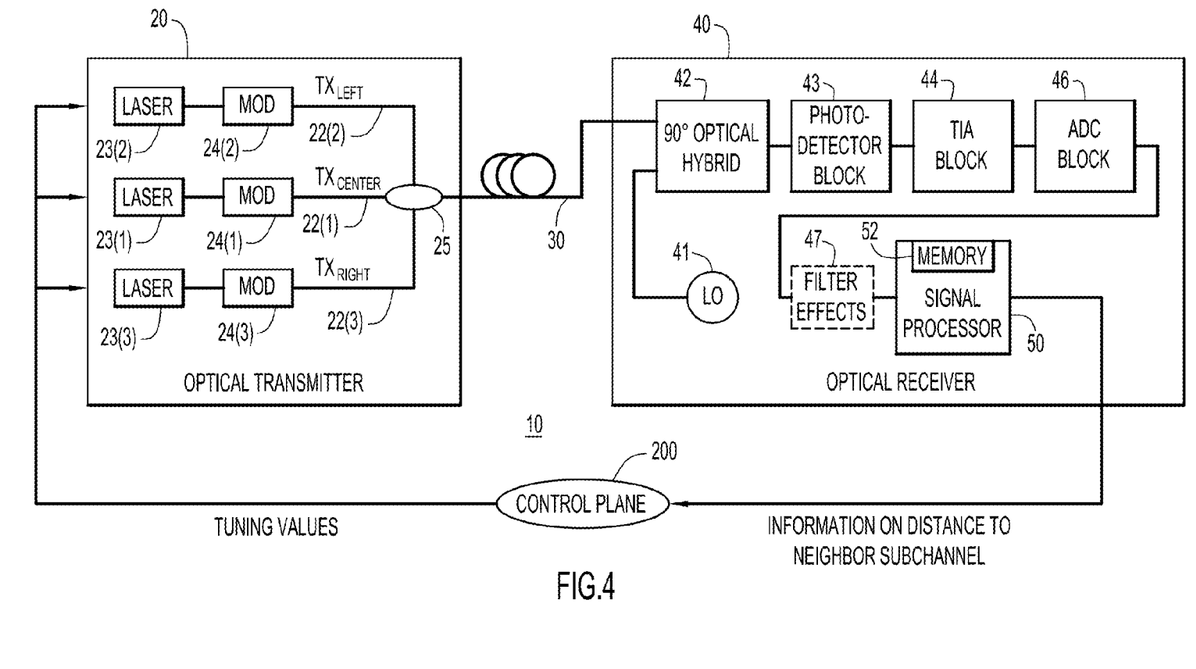
FIG. 4 is an example of a system block diagram showing how an optical receiver at one node may transmit information indicating the subchannel spacing to a control plane for controlling the tuning of a laser of an optical transmitter at another node.

There are many ways in which the frequency/wavelength for a subchannel may be reported back to the optical transmitter. A message may be sent to the optical transmitter, where the message includes information about the distance between the subchannel of interest and at least one neighbor subchannel. FIG. 4 illustrates one configuration in which information about the distance/spacing is relayed by way of a control plane to the optical transmitter.

Referring now to FIG. 4, an example configuration is shown in which the subchannel distance/spacing information computed, as described above, is sent back to the optical transmitter and used to control wavelength/frequency of individual subchannels. In the configuration of FIG. 4, the distance to a left and a right neighbor subchannel for a given subchannel of interest is reported to a control plane 200. The control plane 200 will generate tuning/correction values to the appropriate laser(s) in the optical transmitter, if adjustment is needed. The control plane 200 may consist of one or more remote server computers that are coupled to each of the optical nodes for control purposes. In another form, the signal processor 50 in the optical receiver 40 will compute the tuning/correction values, send them to the control plane 200, and the control plane 200 sends the tuning/correction values computed by the optical receiver to the optical transmitter.

Figure 5:
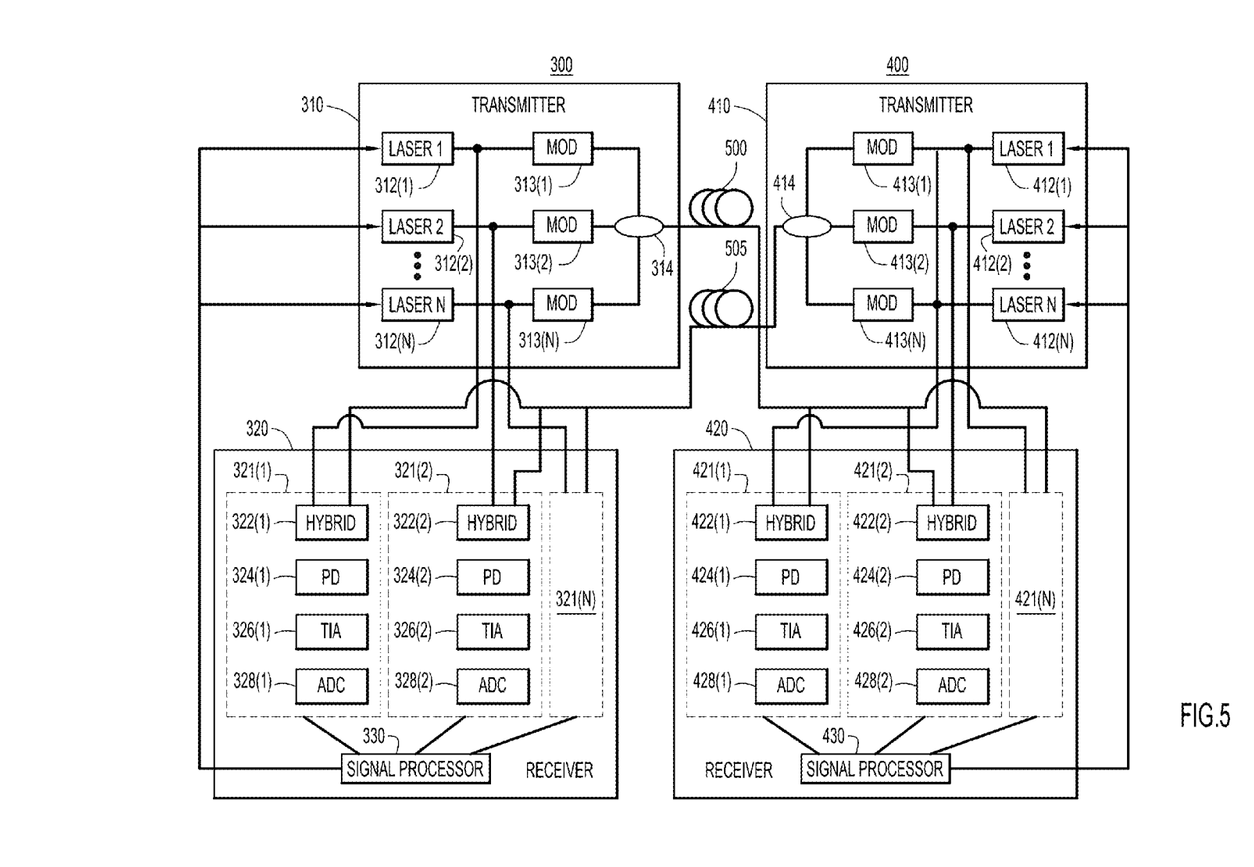
FIG. 5 is an example of another system block diagram that shows how the subchannel spacing information can be inherently communicated between nodes that employ a single laser autonomic system architecture for each optical subchannel.
Figure 6:
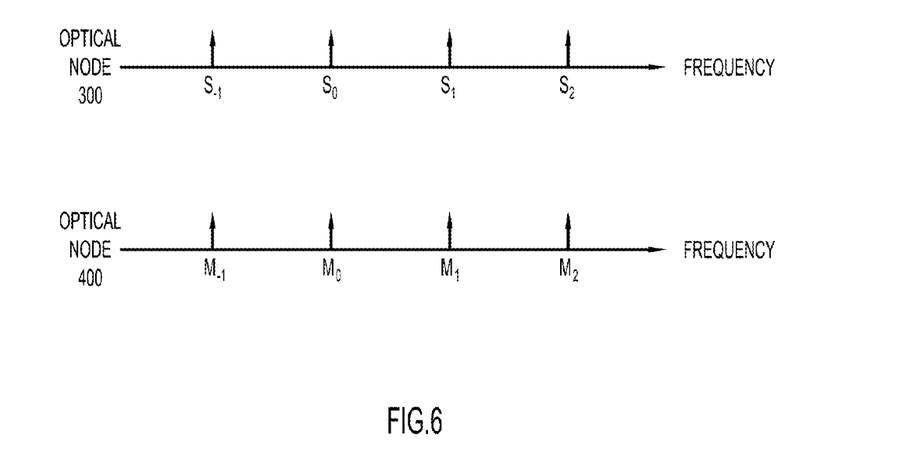
FIG. 6 is a diagram illustrating the subchannel assignments and a technique employed in the system of FIG. 5 to communicate subchannel spacing.

Reference is now made to FIGS. 5 and 6 for another way of conveying information about the spacing between adjacent subchannels across an optical network. FIG. 5 shows two optical nodes 300 and 400 each coupled to optical fibers 500 and 505. Optical fiber 500 carriers optical signals in the "west-east" direction (from left to right) from optical node 300 to optical node 400, and optical fiber 505 carriers optical signals in the "east-west" direction (from right to left) from optical node 400 to optical node 300. Each optical node is configured to operate in a single-laser-autonomic mode by which the same laser for a given wavelength is used for both transmission and as a local oscillator for coherent reception.

For example, optical node 300 comprises an optical transmitter section 310 that comprises a plurality of lasers 312(1)-312(N), a corresponding plurality of optical modulators (Mod) 313(1)-313(N) and an optical combiner 314. The optical combiner 314 is coupled to optical fiber 500 so that optical signals are transmitted from optical node 300 over optical fiber 500 to optical node 400. Similarly, the optical node 400 comprises an optical transmitter section 410 that comprises a plurality of lasers 412(1)-412(N), a corresponding optical modulator (Mod) 413(1)-413(N) and an optical combiner 414. The optical combiner 414 is coupled to optical fiber 505 so that optical signals are transmitted from optical node 400 over optical fiber 505 to optical node 300.

The optical node 300 comprises an optical receiver 320 that comprises a plurality of receiver chains 321(1)-321(N). Each receiver chain comprises a 90° optical hybrid, a photodetector (PD) block, a TIA block, and an ADC block. For example, receiver chain 321(1) comprises hybrid 322(1), PD block 324(1), TIA block 326(1) and ADC block 328(1). Receiver chain 322(2) comprises hybrid 322(2), PD block 324(2), TIA block 326(2) and ADC block 328(2). Each of the hybrids 322(1)-322(N) are coupled to the optical fiber 505 to receive signals transmitted from optical node 400. The outputs from all of the receiver chains 321(1)-321(N) are coupled to the signal processor 330. The blocks inside receiver chain 321(N) are not shown for simplicity. In another form, each of the receiver chains 321(1)-321(N) has its own signal processor.

Likewise, the optical node 400 comprises an optical receiver 420 that comprises a plurality of receiver chains 421(1)-421(N). Receiver chain 421(1) comprises a hybrid 422(1), a PD block 424(1), a TIA block 426(1), and an ADC block 428(1). Receiver chain 421(2) comprises hybrid 422(2), a PD block 424(2), a TIA block 426(2), and an ADC block 428(2). The components inside receiver chain 421(N) are not shown for simplicity. Each of the hybrids 422(1)-422(N) are coupled to the optical fiber 50 to receive signals transmitted from optical node 300. The outputs from each of the receiver chains 421(1)-421(N) are coupled to a signal processor 430. Alternatively, each receiver chain 421(1)-421(N) has its own signal processor.

In optical node 300, in addition to being coupled to a corresponding optical modulator in the transmitter 310, the output of each of the lasers 312(1)-312(N) is coupled to the to the hybrid in a corresponding one of the receiver chains 321(1)-321(N) as shown in FIG. 5. In optical node 400, in addition to being coupled to a corresponding optical modulator in the transmitter 410, the output of each of the lasers 412(1)-412(N) is coupled to the hybrid in a corresponding one of the receiver chains 421(1)-421(N). In this way, the lasers in each optical node are used both for transmission and as a local oscillator for reception. The signal processor 330 in optical node 300 controls the frequency/wavelength of the lasers 312(1)-312(N) and the signal processor 430 in optical node 400 controls the frequency/wavelength of the lasers 412(1)-412(N). In the configuration of FIG. 5, each laser is used for transmitting on a wavelength and for recovering an optical signal received on approximately the same wavelength (intradyne).

As shown in FIG. 6, one of the optical nodes is deemed to transmit on master (M) subchannels and the other optical node to transmit on slave (S) channels. For example, optical node 400 is deemed to transmit on master subchannels and optical node 300 to transmit on slave subchannels. In this master-slave configuration, the optical node 300, as the slave, locks the wavelengths of its subchannels to the wavelengths transmitted by the optical node 400. Thus the optical node 400, as the master, determines the spacing of the wavelengths transmitted by the optical node 300, the slave. In the example of FIG. 6, there are four subchannels. Since subchannel $M_0$ is defined as the center of a superchannel the optical node 400 just changes the frequency/wavelength of subchannel $M_0$ when the superchannel is to be moved, but not for other purposes. Each receiver chain in the optical nodes can detect spectral components from its adjacent/neighbor subchannels. At optical node 300, the frequency/wavelength of each of its slave subchannels is adjusted so that each is centered on its corresponding received subchannel. In other words, for the subchannels transmitted by the optical node 300, the optical node 300 copies the subchannel alignment of the master subchannels based on the frequency/wavelength of each master subchannel. Then, the signal processor 430 in optical node 400 adjusts the frequency of the laser for subchannel $M_1$ to be the correct distance to/spacing from subchannel $M_0$, and similarly adjusts the frequency of the laser for subchannel $M_2$ to be the correct distance to/spacing from subchannel $M_1$ and $M_{-1}$ to be the correct distance to/spacing from subchannel $M_0$, where spacings between receive subchannels are computed using the techniques described herein in connection with FIGS. 2-4. The wavelength of subchannel $S_{-1}$ equals the wavelength of subchannel $M_{-1}$, the wavelength of subchannel $S_0$ equals the wavelength of subchannel $M_0$, and so on. When the optical node 400 transmits to the optical node 300 on the frequencies/wavelengths for subchannels $M_{-1}$, $M_0$, $M_1$, and $M_2$, the optical node 300 receives on these wavelengths and uses those wavelengths for transmitting back on its subchannels at wavelengths $S_{-1}$, $S_0$, $S_1$, and $S_2$ to the optical node 400. In the configuration in which each receiver chain in an optical node has its own processor (instead of one processor shared by all of the receiver chains), the processor of one subchannel, e.g., subchannel $M_0$, can control its own distance to the direct neighbors. In the configuration in which a single processor is shared among all receiver chains in an optical node, then that processor will have information about every subchannel in the superchannel to facilitate the aforementioned operations.

The optical node 400 performs the operations depicted in FIG. 3 (receiving, converting, transforming and computing) based on an optical field of subchannels transmitted by the optical node 300, and the signal processor in the optical node 400 adjusts a wavelength of a laser at the optical node 400 based on the distance relative to a particular one of the plurality of subchannels, e.g., subchannel $M_0$. The optical node 300 receives optical signals from the optical node 400, including the optical signal for the subchannel for which the laser was adjusted at the optical node 400. The optical node 300 determines the wavelength/frequency for that subchannel, and copies that wavelength/frequency by adjusting the laser for that subchannel (slave subchannel) used at the optical node 300 to transmit to the optical node 400 based on the wavelength determined for the optical signal at the optical node 300. Thus, the optical node 400 can have "master" control of the wavelengths/frequencies that are used between it and optical node 300 without having to use a control plane mechanism.

FIG. 5, when viewed in conjunction with FIG. 6, represents a system comprising a first node and a second node each coupled to two optical fibers to send and receive optical signals in a plurality of subchannels at respective wavelengths over the optical fibers to each other. Each of the first and second nodes is configured, with respect to the plurality of subchannels of optical signals received from the other node, to: convert a received optical field containing the plurality of subchannels to digital complex valued data; transform the digital complex valued data to the frequency domain to produce spectrum data; and compute a distance between a subchannel of interest among the plurality of subchannels and at least one neighbor subchannel based on the spectrum data. The second node is further configured to determine a wavelength of one of the plurality of subchannels received from the first node and adjust a laser at the second node used to transmit to the first node based on the wavelength determined for the subchannel at the second node. Each node may determine the spacings between received optical subchannels using either or both of the gap and peak methods described herein.

The above description is intended by way of example only.

What is claimed is:

1. A method comprising:
receiving on an optical fiber an optical field comprised of a plurality of subchannels of optical signals at respective wavelengths;
using coherent optical reception in conjunction with analog-to-digital conversion, converting the received optical field to digital complex valued data;
transforming the digital complex valued data to the frequency domain to produce electrical spectrum data; and
computing a distance between a subchannel of interest among the plurality of subchannels and at least one neighbor subchannel based on the electrical spectrum data,
wherein the computing comprises measuring a distance between points in the electrical spectrum data that are on opposite sides of a minimum point and which are at a predetermined power level, and adding a correction term to the measured distance to determine a distance between a center of the subchannel of interest and a center of the neighbor subchannel.

2. The method of claim 1, wherein computing includes determining a distance between a center of the subchannel of interest and a peak associated with an edge of the neighbor subchannel.

3. The method of claim 1, wherein computing includes measuring the distance between the center of the subchannel of interest and the peak associated with the edge of the neighbor subchannel and adding a correction term to determine the distance between the center of the subchannel of interest and a center of the neighbor subchannel.

4. The method of claim 1, and further comprising determining an amount of tuning for the subchannel of interest based on a target spacing between the subchannel of interest and the neighbor subchannel minus a distance between a center of the subchannel of interest and a center of the neighbor subchannel.

5. The method of claim 1, wherein computing includes computing a distance between the subchannel of interest and each of its neighbor subchannels on opposite sides of the subchannel of interest.

6. The method of claim 1, further comprising sending to an optical transmitter that transmits the plurality of subchannels of optical signals a message that includes information about the distance between the subchannel of interest and the at least one neighbor subchannel.

7. The method of claim 1, further comprising sending a message that includes information about the distance between the subchannel of interest and at least one neighbor subchannel to a control plane that generates tuning values, if needed, and sends the tuning values to an optical transmitter that transmits the plurality of subchannels of optical signals.

8. The method of claim 1, wherein receiving, converting, transforming and computing are performed at a first node coupled to the optical fiber based on the optical field transmitted by a second node that is coupled to the optical fiber, and further comprising adjusting a wavelength of a laser at the first node based on the distance relative to a particular one of the plurality of subchannels.

9. The method of claim 8, further comprising at the second node, determining a wavelength of one of the plurality of subchannels received from the first node, and adjusting a laser at the second node used to transmit to the first node based on the wavelength determined for the subchannel at the second node.

10. The method of claim 1, wherein computing is performed for each of the plurality of subchannels.

11. An apparatus comprising:
an optical hybrid unit configured to receive on an optical fiber an optical field comprised of a plurality of subchannels of optical signals at respective wavelengths and to mix the received optical field with a local oscillator optical signal;
a photodetector unit coupled to the optical hybrid unit and configured to receive as input the optical field and to convert the optical field to electrical signals; and
an analog-to-digital converter unit configured to convert the electrical signals to digital complex valued data;
a signal processor coupled to the analog-to-digital filter and configured to:
transform the complex valued data to the frequency to produce electrical spectrum data; and
compute a distance between a subchannel of interest among the plurality of subchannels and at least one neighbor subchannel based on the electrical spectrum data by measuring a distance between points in the electrical spectrum data that are on opposite sides of a minimum point and which are at a predetermined power level, and adding a correction term to the measured distance to determine a distance between a center of the subchannel of interest and a center of the neighbor subchannel.

12. The apparatus of claim 11, wherein the signal processor is configured to determine a distance between a center of the subchannel of interest and a peak associated with an edge of the neighbor subchannel.

13. The apparatus of claim 12, wherein the signal processor is configured to measure the distance between the center of the subchannel of interest and the peak associated with the edge of the neighbor subchannel and add a correction term to the measured distance to determine the distance between the center of the subchannel of interest and the center of the neighbor subchannel.

14. The apparatus of claim 11, wherein the signal processor is further configured to determine an amount of tuning for the subchannel of interest based on a target spacing between the subchannel of interest and the neighbor subchannel minus a distance between a center of the subchannel of interest and a center of the neighbor subchannel.

15. The apparatus of claim 11, wherein the signal processor is further configured to compute a distance between the subchannel of interest and each of its neighbor subchannels on opposite sides of the subchannel of interest.

16. The apparatus of claim 11, wherein the signal processor is further configured to send to an optical transmitter that transmits the plurality of subchannels of optical signals a message that includes information about the distance between the subchannel of interest and the at least one neighbor subchannel.

17. The apparatus of claim 11, wherein the signal processor is further configured to send a message that includes information about the distance between the subchannel of interest and the at least one neighbor subchannel to a control plane that generates tuning values, if needed, and sends the tuning values to an optical transmitter that transmits the plurality of subchannels of optical signals.

18. One or more non-transitory computer readable storage media encoded with software comprising computer executable instructions and when the software is executed operable to:
   transform digital complex valued data derived from a received optical field comprising a plurality of subchannels of optical signals at respect wavelengths, to the frequency domain to produce electrical spectrum data; and
   compute a distance between a subchannel of interest among the plurality of subchannels and at least one neighbor subchannel based on the electrical spectrum data by measuring a distance between points in the electrical spectrum data that are on opposite sides of a minimum point and which are at a predetermined power level, and adding a correction term to the measured distance to determine a distance between a center of the subchannel of interest and a center of the neighbor subchannel.

19. The non-transitory computer readable storage media of claim 18, further comprising instructions operable to determine an amount of tuning for the subchannel of interest based on a target spacing between the subchannel of interest and the neighbor subchannel minus a distance between a center of the subchannel of interest and a center of the neighbor subchannel.

20. The non-transitory computer readable storage media of claim 18, wherein the instructions operable to compute comprise instructions operable to compute a distance between the subchannel of interest and each of its neighbor subchannels on opposite sides of the subchannel of interest.

21. The non-transitory computer readable storage media of claim 18, further comprising instructions operable to send to an optical transmitter that transmits the plurality of subchannels of optical signals a message that includes information about the distance between the subchannel of interest and the at least one neighbor subchannel.

22. A system comprising:
   a first node and a second node each coupled to optical fibers to send and receive optical signals in a plurality of subchannels at respective wavelengths over the optical fibers to each other;
   wherein each of the first and second nodes is configured, with respect to the plurality of subchannels of optical signals received from the other node, to:
      convert a received optical field containing the plurality of subchannels to digital complex valued data;
      transform the digital complex valued data to the frequency domain to produce electrical spectrum data; and
      compute a distance between a subchannel of interest among the plurality of subchannels and at least one neighbor subchannel based on the electrical spectrum data;
   wherein the second node is configured to determine a wavelength of one of the plurality of subchannels received from the first node and adjust a laser at the second node used to transmit to the first node based on the wavelength determined for the subchannel at the second node, and
   wherein each of the first and second nodes computes the distance by measuring a distance between points in the electrical spectrum data that are on opposite sides of a minimum point and which are at a predetermined power level, and adding a correction term to the measured distance to determine a distance between a center of the subchannel of interest and a center of the neighbor subchannel.

23. The method of claim 1, further comprising sending to an optical transmitter that transmits the plurality of subchannels of optical signals a message that includes information about the distance between the subchannel of interest and the at least one neighbor subchannel.

24. The method of claim 1, wherein receiving, converting, transforming and computing are performed at a first node coupled to the optical fiber based on the optical field transmitted by a second node that is coupled to the optical fiber, and further comprising adjusting a wavelength of a laser at the first node based on the distance relative to a particular one of the plurality of subchannels.

25. The method of claim 24, further comprising at the second node, determining a wavelength of one of the plurality of subchannels received from the first node, and adjusting a laser at the second node used to transmit to the first node based on the wavelength determined for the subchannel at the second node.

26. The apparatus of claim 11, wherein the signal processor is further configured to send to an optical transmitter that transmits the plurality of subchannels of optical signals a message that includes information about the distance between the subchannel of interest and the at least one neighbor subchannel.

27. The apparatus of claim 11, wherein the signal processor is further configured to send a message that includes information about the distance between the subchannel of interest and the at least one neighbor subchannel to a control plane that generates tuning values, if needed, and sends the tuning values to an optical transmitter that transmits the plurality of subchannels of optical signals.

28. The non-transitory computer readable storage media of claim 18, wherein the instructions operable to compute comprise instructions operable to measure the distance between the center of the subchannel of interest and the peak associated with the edge of the neighbor subchannel and a correction term to the measured distance to determine the distance between the center of the subchannel of interest and the center of the neighbor subchannel.

29. The non-transitory computer readable storage media of claim 18, further comprising instructions operable to determine an amount of tuning for the subchannel of interest based on a target spacing between the subchannel of interest and the neighbor subchannel minus a distance between a center of the subchannel of interest and a center of the neighbor subchannel.

30. The system of claim 22, wherein each of the first and second nodes computes the distance by measuring the distance between center of the subchannel of interest and the peak associated with the edge of the neighbor subchannel and adding a correction term to the measured distance to determine the distance between the center of the subchannel of interest and the center of the neighbor subchannel.

31. The system of claim 22, wherein the first and second nodes determine an amount of tuning for the subchannel of interest based on a target spacing between the subchannel of interest and the neighbor subchannel minus the distance between the center of the subchannel of interest and the center of the neighbor subchannel.

* * * * *